Jan. 11, 1949.  A. E. DENTLER  2,458,572
FRICTION SHOCK ABSORBING MECHANISM
FOR RAILWAY DRAFT RIGGINGS
Filed Aug. 9, 1946  2 Sheets-Sheet 1
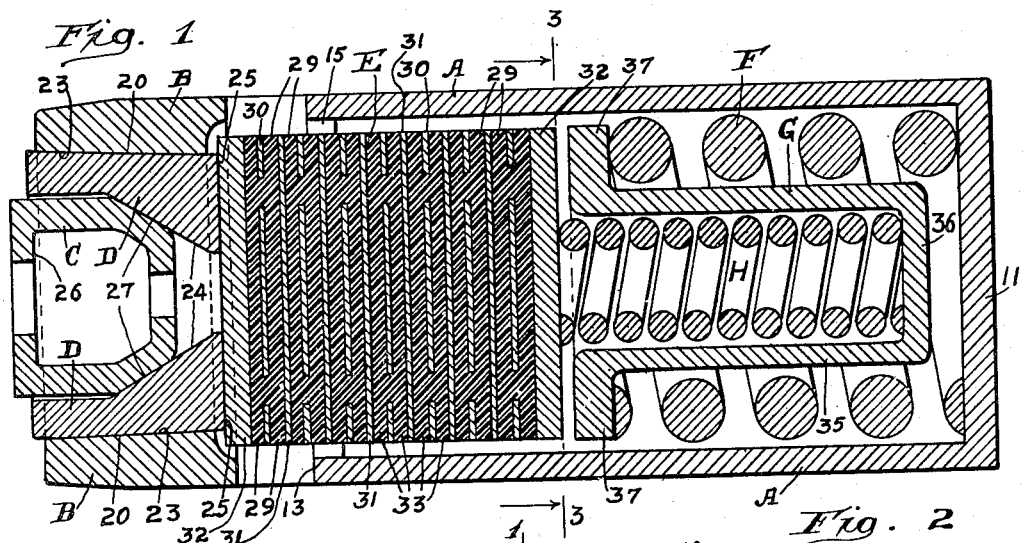
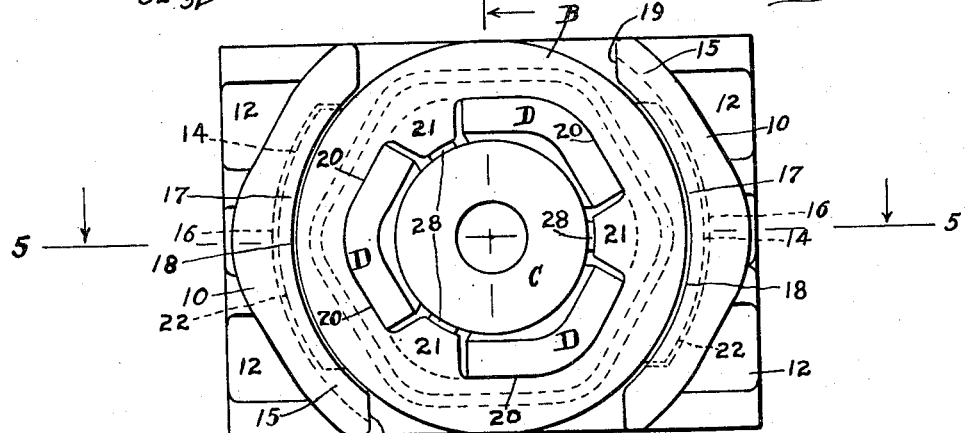
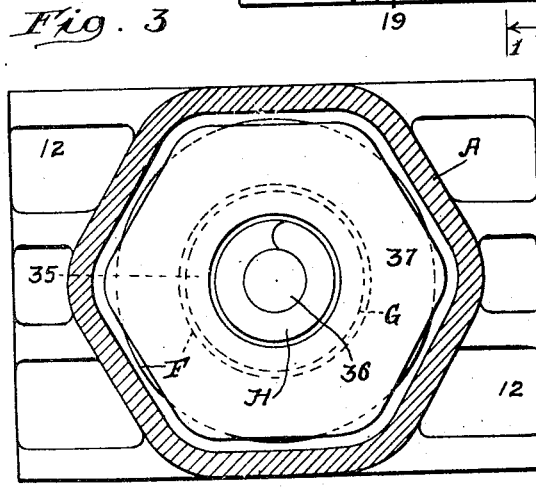
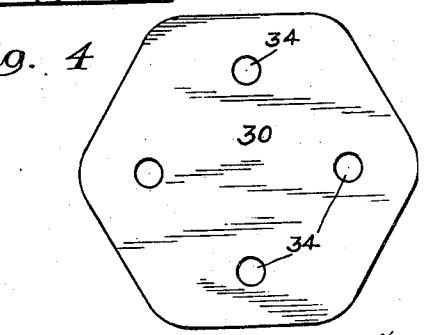
Inventor:
Arnold E. Dentler.
By Henry Fuchs.
Atty Jan. 11, 1949.  A. E. DENTLER  2,458,572
FRICTION SHOCK ABSORBING MECHANISM
FOR RAILWAY DRAFT RIGGINGS
Filed Aug. 9, 1946  2 Sheets-Sheet 2
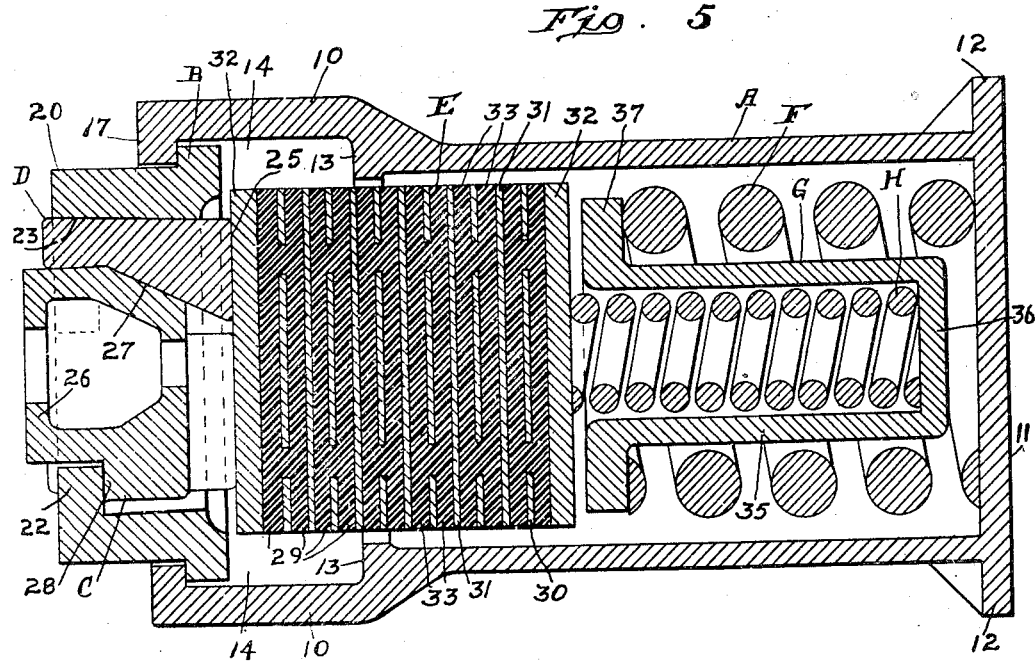
Inventor:
Arnold E. Dentler.
By Henry Fuchs
Atty.

Patented Jan. 11, 1949

2,458,572

UNITED STATES PATENT OFFICE 2,458,572

FRICTION SHOCK ABSORBING MECHANISM FOR RAILWAY DRAFT RIGGINGS

Arnold E. Dentler, La Grange, Ill., assignor to W. H. Miner, Inc., Chicago, Ill., a corporation of Delaware Application August 9, 1946, Serial No. 689,366

11 Claims. (Cl. 213—24)

This invention relates to improvements in friction shock absorbing mechanisms for railway draft riggings.

One object of the invention is to provide a friction shock absorbing mechanism, adapted for railway draft riggings, having light initial resistance produced by the combined action of rubber and spring cushioning means followed by progressively increasing, relatively high resistance produced by friction means.

A further object of the invention is to provide a friction shock absorbing mechanism including a housing containing cushioning means, a friction shell, a friction clutch slidingly telescoped within the shell and having frictional engagement therewith, wherein the friction shell has limited relative movement with respect to the housing, resisted by the cushioning means to provide for relatively light initial action to take care of the lighter shocks, and movement of the friction shell with respect to the housing is positively arrested after a predetermined compression of the mechanism to compel relative movement of the friction clutch with respect to the shell during the remainder of the compression stroke to produce relatively high frictional resistance for absorbing the heavier shocks.

Another object of the invention is to provide a friction shock absorbing mechanism as set forth in the preceding paragraph, wherein the cushioning means serves to yieldingly oppose both movement of the friction shell with respect to the casing and of the friction clutch inwardly of the shell, the parts of the mechanism being so designed that the progressively increasing resistance afforded by the action of the cushioning means and friction means is effectively blended throughout the compression stroke of the mechanism, thereby assuring smooth action of the mechanism.

Yet another object of the invention is to provide a mechanism as hereinbefore set forth, wherein the cushioning means, which opposes relative movement of the friction shell and casing to absorb the lighter shocks and opposes relative movement of the friction clutch and shell to take care of the heavier shocks, includes a combination of jointly acting rubber and spring elements.

A still further object of the invention is to provide a cushioning means of the character set forth in the preceding paragraph including a rubber element, a relatively heavy steel spring element, and a relatively lighter spring member, wherein the lighter spring member provides for free spring action and serves to hold both the rubber element and the heavy spring element under initial compression.

Other objects of the invention will more clearly appear from the description and claims hereinafter following.

In the accompanying drawings forming a part of this specification, Figure 1 is a longitudinal, vertical sectional view of my improved friction shock absorbing mechanism, corresponding substantially to the line 1—1 of Figure 2. Figure 2 is a front elevational view of Figure 1, looking from left to right in said figure. Figure 3 is a transverse, vertical sectional view, corresponding substantially to the line 3—3 of Figure 1. Figure 4 is an elevational view of one of the spacer or backing plates employed in my improved mechanism. Figure 5 is a horizontal sectional view, corresponding substantially to the line 5—5 of Figure 2.

My improved friction shock absorbing mechanism as shown in the drawings comprises broadly a casing A; a friction shell B connected to the casing for limited inward and outward movement; a friction clutch comprising a central wedge C and three friction shoes D—D—D slidable in the friction shell; a rubber spring element E; a heavy outer coil spring F; a spring follower thimble G; and a relatively light, inner coil spring H within the thimble reacting between the rubber spring element E and the outer coil spring F.

The casing A is in the form of a tubular casting having laterally spaced, opposed, forwardly projecting arms 10—10 at its outer or front end. The casing proper, as shown, is of hexagonal, transverse cross section and has a transverse wall 11 closing the rear end thereof. The wall 11 is laterally extended to provide flanges 12—12, which, together with the wall 11, form an integral follower member on the casing. At the outer or left hand end, as seen in Figure 1, that is, at the inner ends of the arms 10—10 thereof, the casing proper presents a transverse abutment face 13, which extends continuously around the casing. The projecting arms 10 are laterally outwardly offset with respect to the main body portion of the casing, as seen in Figure 2. On the inner side, each arm 10 is provided with a longitudinally extending, relatively wide guideway 14 defined by spaced side walls 15 and 15 and a curved rear wall 16. The guideway is closed at its front end by a transverse wall which is in the form of an inturned stop flange 17. The inner edge face of the stop flange is of arc-shaped form, as indicated at 18, and the opposed edge faces of the two arms are concentric, as clearly shown in Figure 2. As further seen in Figure 2, the wall 15 at the lower side of the arm 10 at the right hand side of said figure is continuous, extending from end to end of the guideway, but the top wall 15 of said arm is interrupted, being cut away at its inner end to provide a laterally directed, inlet opening 19, and the wall 15 at the upper side of the arm 10 at the left hand side of said figure is continuous, extending from end to end of the guideway, but the bottom wall of said last named arm is interrupted, being cut away at its lower end to provide an inlet opening similar to the opening 19 of the arm at the right hand side of said figure and also indicated by 19.

The friction shell B is in the form of a tubular member of substantially cylindrical, exterior shape, open at its front and rear ends, and is of such external diameter as to slidingly fit between the curved edges 18—18 presented by the flanges 17—17 of the arms 10—10 of the casing. The interior of the shell B is of substantially hexagonal cross section and presents three rearwardly extending, interior friction surfaces 20—20—20 of V-shaped, transverse section, each surface being formed on two adjacent walls of the hexagonal, interior section of the shell. The friction surfaces 20—20—20 preferably converge inwardly of the shell. At the forward end, the shell has a set of three inwardly projecting stop lugs 21—21—21 which are spaced circumferentially of the shell, the same being alternated with the friction surfaces 20—20—20. In other words, one stop lug is located between each set of adjacent friction surfaces. At the inner end of the shell B are provided two diametrically opposite, laterally outwardly extending, retaining flanges 22—22, which are in the form of arc-shaped wings engaged within the guideways 14—14 of the arms 10—10 of the casing A. Each arc-shaped flange is of such a thickness that it will pass freely through the inlet opening 19 of the guideway 14 of the corresponding arm of the casing when the shell is rotated to enter said flange in edgewise direction. Each flange 22 is of such a width that it slidingly fits between the walls 15—15 of the corresponding guideway 14 for movement lengthwise of the mechanism.

The friction shoes D—D—D are slidingly arranged within the shell B. Each shoe has a lengthwise extending friction surface 23 on the outer side of V-shaped, transverse section engaging the corresponding V-shaped friction surface 20 of the shell and correspondingly inclined thereto. On the inner side, each shoe has a flat wedge face 24 adapted to cooperate with the wedge block C. At the rear ends, the shoes present flat, transverse abutment faces 25—25 for the rubber cushioning element E.

The wedge C is in the form of a hollow block having a flat, transverse, front end face 26 adapted to bear on the usual front follower of the railway draft rigging. On the outer side thereof, the wedge block C has three inwardly converging, flat wedge faces 27—27—27, correspondingly inclined to and engaging with the wedge faces 24—24—24 of the shoes D—D—D, respectively. At the rear end, the block C is provided with three radially outwardly projecting retaining lugs 28—28—28, which extend between adjacent shoes and are engaged in back of the corresponding stop lugs 21—21—21 of the friction shell to limit outward movement of the wedge with respect to the shell.

The rubber cushioning element E comprises a plurality of rubber mats 29, backing plates 30, spacing or separator plates 31, and a pair of end followers 32—32. Each rubber mat 29 includes a pair of flat sections 33—33 of hexagonal outline at opposite sides of the corresponding backing plate 30, which is also of hexagonal outline and of substantially the same size as the mat. The backing plate 30 has perforations 34 therethrough, which accommodate connecting portions of the sections 33—33 of the mat. The rubber mats 29 are arranged in series lengthwise of the mechanism within the forward end of the casing A, and the rubber cushioning element E preferably comprises seven such mats. The mats 29 are separated by the spacer plates 31, which are alternated with the mats, each spacer plate being of hexagonal outline and corresponding in size to the mats. The followers 32—32 which are in the form of relatively thick plates are arranged at opposite ends of the element E and bear directly on the rubber mats at the corresponding ends of the cushioning element. These followers are also of hexagonal shape and correspond in size to the mats. The front follower 32 bears directly on the inner ends of the shoes D.

The coil springs F and H and the thimble G are arranged within the casing A rearwardly of the rubber cushioning element E, as clearly shown in Figure 1. The spring follower thimble G comprises an elongated portion 35 of cylindrical cross section closed at its rear end by a transverse wall 36 and having a laterally outwardly projecting, annular flange 37 at its open front end. The heavy coil spring F surrounds the thimble G and has its front and rear ends bearing respectively on the inner side of the flange 37 of the thimble and the end wall 11 of the casing A, and the lighter coil spring H is seated within the thimble and has its front and rear ends bearing respectively on the rear side of the rear follower 32 of the rubber cushioning element E and the inner side of the end wall 36 of the thimble.

In the assembled condition of the mechanism, the springs F and H and the rubber cushioning element E are under a predetermined amount of initial compression, the light spring H being normally compressed to a sufficient extent to maintain the rubber cushioning element E and the heavy spring F under slight compression. As will be seen upon reference to Figure 1, which shows the normal full release position of the mechanism, the parts are so proportioned that the rear end of the thimble G is spaced an appreciable distance from the rear wall 11 of the casing, and the annular flange 37 at the front end of the thimble is spaced slightly from the rear follower 32 of the rubber cushioning element E, and that the yielding means comprising the cushioning element E, the springs F and H holds the shoes D—D—D and the wedge C projected with the lugs 28 of the wedge shouldered against the lugs 21 of the casing A, thus holding the friction shell B spaced from the ledge formed by the abutment face 13 of the casing A.

In this connection it is further pointed out that outward movement of the shell is positively limited by engagement of the flanges 22 thereof with the flanges 17 of the casing A.

In the operation of my improved shock absorbing mechanism, during compression thereof, the wedge C and the shoes D—D—D are forced inwardly of the casing A against the resistance of the cushioning unit E and springs H and F and, due to the friction existing between the shoes and the friction shell B, the shell is carried inwardly toward the casing A in unison with the shoes until the inner end of the shell comes into engagement with the abutment face 13 of the casing, whereupon further inward movement of the shell is arrested. When the inward movement of the shell is arrested, the wedge and shoes are compelled to move inwardly of the shell as the mechanism is being further compressed, thereby providing high frictional resistance during the remainder of the compression stroke. As will be evident, during the time that the friction shell moves inwardly of the casing, cushioning is effected by compression of the rubber cushioning element E and the springs F and H without any action of the friction elements of the mechanism, the relatively light spring H being first compressed, together with the rubber element E, compression of the latter being very slight. During this action, the spring F remains substantially idle, due to its high capacity, and the spring H acts as a preliminary spring, which has relatively soft action. This takes care of the relatively light shocks and vibrations to which the mechanism is subjected in service. Under heavier shocks by which the mechanism is further compressed, the heavy spring F, together with the rubber cushioning element E, are compressed, the rear follower of the rubber cushioning element E being brought into contact with the flange 37 of the spring follower thimble G to force the same rearwardly and effect compression of the spring F. Cushioning is thus provided for increasingly heavier shocks without the friction elements coming into action. As compression of the mechanism progresses, the clearance between the rear end of the spring follower thimble G and the end wall 11 of the casing is taken up and movement of the spring follower thimble G arrested by engagement with said wall. After the spring follower thimble being thus arrested, the still heavier shocks are absorbed by compression of the rubber cushioning element E against the spring follower thimble G, which acts as a solid column to transmit the load to the rear wall 11 of the casing. Upon still further compression of the mechanism, the friction shell B comes into engagement with the abutment face 13 of the casing, thereby arresting movement of the shell and compelling the friction clutch to move inwardly of the shell against the resistance of the rubber cushioning element E, thereby generating high frictional resistance to take care of the excessively heavy shocks. Compression of the mechanism is limited when the wedge C is forced inwardly of the shell to such an extent that the pressure transmitting member or follower which bears on the wedge contacts the outer end of the shell. The pressure is then transmitted directly through the shell to the casing, these parts acting as a solid column to transmit the load.

When the actuating force is reduced, the expansive action of the springs F and H and rubber cushioning element E returns all of the parts to the normal full release position shown in Figure 1, the shoes being forced outwardly directly by the rubber cushioning element and springs and, due to their frictional engagement with the shell B, carrying the latter outwardly therewith until stopped by the flanges 17—17 of the casing, whereupon the shoes D and the wedge block C will be projected outwardly of the shell until movement of the wedge block is positively arrested by engagement with the lugs 21 of the friction shell.

From the preceding description taken in connection with the drawings, it will be evident that by the employment of the successively acting spring members and the constantly acting rubber cushioning element, together with the friction means, I have provided an extremely flexible shock absorbing device having soft initial action blended with high ultimate capacity.

I claim:

1. In a friction shock absorbing mechanism, the combination with a casing; of a friction shell slidable lengthwise with respect to the casing; a friction clutch slidable within the shell; stop means on the casing for arresting inward movement of said shell after partial compression of the mechanism; and yielding means within the casing opposing movement of said clutch and shell toward the casing, said yielding means including a rubber cushioning element, coil spring means, and a second coil spring means reacting between said element and said first named spring means to normally maintain the same under compression.

2. In a friction shock absorbing mechanism, the combination with a casing; of a friction shell slidable lengthwise with respect to the casing; a friction clutch slidable within the shell; stop means on the casing for arresting inward movement of said shell after partial compression of the mechanism; and yielding means within the casing opposing movement of said clutch and shell toward the casing, said yielding means including a relatively heavy spring, a relatively lighter preliminary spring, follower means for transmitting the pressure from said preliminary spring to said heavy spring, and a rubber cushioning element reacting between said clutch and preliminary spring.

3. In a friction shock absorbing mechanism, the combination with a casing; of a friction shell slidable lengthwise with respect to the casing; a friction clutch slidable within the shell; stop means on the casing for arresting inward movement of said shell after partial compression of the mechanism; and yielding means within the casing opposing movement of said clutch and shell toward the casing, said yielding means including a rubber cushioning element bearing at its front end on said clutch, a preliminary spring bearing at its front end on the rear end of the cushioning element, a relatively heavy spring, and follower means interposed between the preliminary spring and heavy spring, said heavy spring reacting between the casing and follower means.

4. In a friction shock absorbing mechanism, the combination with a casing open at its front end and closed by a transverse wall at its rear end; of a friction shell having limited movement lengthwise toward and away from said open end of the casing; a wedge member adapted to receive the actuating force; friction shoes having sliding frictional engagement with the casing and wedging engagement with said wedge member; a rubber cushioning element within the casing bearing at its front end on said shoes; a floating spring follower member within the casing; a main spring bearing at its front and rear ends on said spring follower member and rear wall of the casing; and a preliminary spring bearing at its front and rear ends on the cushioning element and spring follower, respectively.

5. In a friction shock absorbing mechanism, the combination with a casing open at its front end and closed by a transverse wall at its rear end; of a friction shell having limited movement lengthwise toward and away from said open end of the casing; a wedge member adapted to receive the actuating force; friction shoes having sliding frictional engagement with the casing and wedging engagement with said wedge member; a rubber cushioning element within the casing bearing at its front end on said shoes; a floating spring follower thimble having an exterior flange at its front end and being closed at its rear end; a main spring surrounding said thimble and bearing at its front and rear ends respectively on the flange of the thimble and the rear wall of the casing; and a preliminary spring extending into said thimble and having its front and rear ends bearing respectively on the cushioning element and closed end of said thimble.

6. In a friction shock absorbing mechanism, the combination with a casing open at its front end and closed by a transverse wall at its rear end; of a friction shell having limited movement lengthwise toward and away from said open end of the casing; a wedge member adapted to receive the actuating force; friction shoes having sliding frictional engagement with the casing and wedging engagement with said wedge member; a rubber cushioning element within the casing bearing at its front end on said shoes; a floating spring follower thimble having an exterior follower flange at its front end, said thimble being closed at its rear end, said flange being normally spaced from said cushioning element and engageable thereby after a predetermined compression of the mechanism; a main spring surrounding said thimble and bearing at its front end on said follower flange and at its rear end on the rear wall of the casing, said main spring normally holding the rear end of the thimble spaced from the rear wall of the casing; and a preliminary spring extending into said thimble and having its front and rear ends bearing on said cushioning element and closed end of the thimble, respectively.

7. In a friction shock absorbing mechanism, the combination with a casing open at its front end and closed by a transverse wall at its rear end; of a friction shell having limited movement lengthwise toward and away from said open end of the casing; a wedge member adapted to receive the actuating force; friction shoes having sliding frictional engagement with the casing and wedging engagement with said wedge member; a rubber cushioning element within the casing bearing at its front end on said shoes; a floating spring follower thimble having a follower flange at its front end, said thimble being closed at its rear end, said flange being normally spaced from the cushioning element and engageable thereby after a predetermined compression of the mechanism; a main spring bearing at its front and rear ends, respectively, on said flange and the rear wall of the casing, said main spring normally holding the thimble with the rear end thereof spaced from the rear end wall of the casing, the normal clearance between said thimble and rear wall of the casing being greater than the normal clearance between the flange of the thimble and the cushioning element, and said combined clearance being less than the total movement of the friction shell with respect to the casing; and a preliminary spring extending into the thimble and having its front and rear ends bearing on said cushioning element and closed end of the thimble, respectively, said preliminary spring being under initial compression.

8. In a cushioning unit compressible between two members which are relatively movable toward each other, the combination with a rubber element; of coil spring means; and a second coil spring means reacting between said element and first named coil spring means to normally maintain the latter and said element under predetermined initial compression.

9. In a cushioning unit compressible between two members which are relatively movable toward each other, the combination with a relatively heavy spring; of a relatively lighter spring; follower means for transmitting the pressure from said lighter spring to the heavier spring; and a rubber cushioning element backed by said lighter spring.

10. In a cushioning unit compressible between two members which are relatively movable toward each other, the combination with a rubber cushioning element; of a relatively light preliminary spring; a second heavier spring; and follower means interposed between said preliminary spring and heavier spring, said rubber cushioning element and heavier spring being at opposite ends of the unit and receiving the actuating forces, and said preliminary spring reacting between said cushioning element and heavier spring and having its opposite ends bearing on said follower and cushioning element.

11. In a cushioning unit compressible between two members which are relatively movable toward each other, the combination with a rubber cushioning element at one end of said unit; of a heavy spring at the other end of said unit; a follower having a flange disposed between said cushioning element and heavy spring, said flange bearing on said heavy spring and being normally spaced from said element, said flange being engageable by said element after a predetermined partial compression of the unit, said follower being normally spaced inwardly from the outer end of said heavy spring; and a relatively light preliminary spring reacting between said element and follower, said preliminary spring being under initial compression and bearing at its opposite ends on said element and follower.

ARNOLD E. DENTLER.

No references cited.